(Model.)

K. D. HUGHES.
Window-Button Securer.

No. 227,978.          Patented May 25, 1880.

Witnesses:          Inventor:
J. Walter Fowler          Kate Duval Hughes
Frank D. Maltby

UNITED STATES PATENT OFFICE.

KATE D. HUGHES, OF WASHINGTON, DISTRICT OF COLUMBIA.

WINDOW-BUTTON SECURER.

SPECIFICATION forming part of Letters Patent No. 227,978, dated May 25, 1880.

Application filed April 1, 1880. (Model.)

*To all whom it may concern:*

Be it known that I, KATE DUVAL HUGHES, a citizen of the United States, residing at Washington, District of Columbia, have invented a new and useful Security-Clasp for Window-Fastenings, of which the following is a specification.

My invention is simply a clasp or hook made of spring-wire placed on a strong screw having a grooved head, as hereinafter explained.

The object of this invention is to secure the window-fastener so effectually that it cannot be opened from the outside. I attain this object by the mechanism illustrated in the accompanying drawings, in which—

Figure 1:
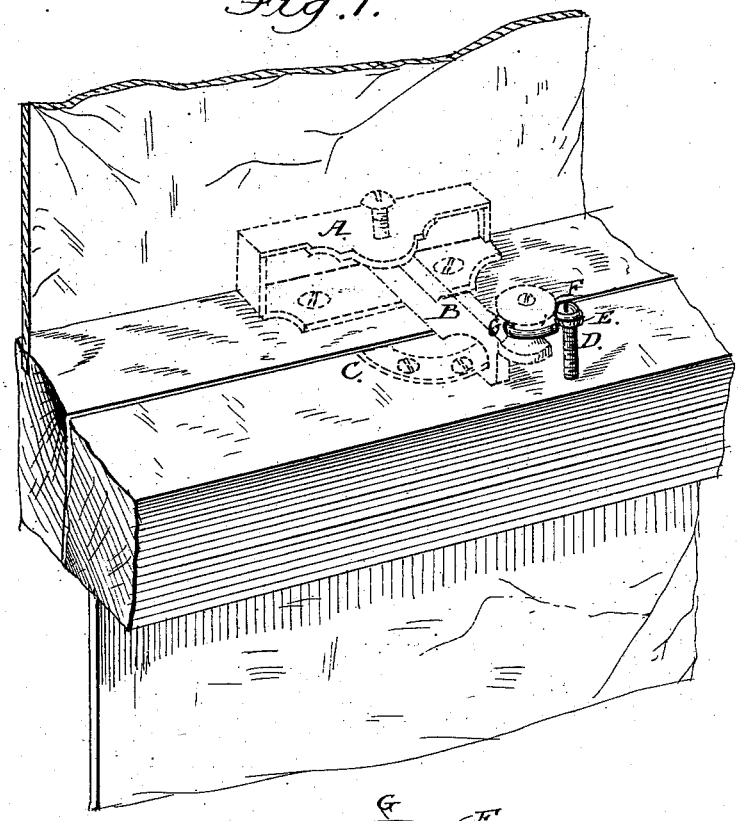
Figure 2:
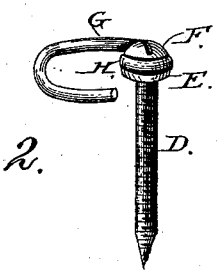

Figure 1 represents the clasp closed and in use. Fig. 2 represents the clasp detached.

In Fig. 2, which represents the security-clasp detached, D represents the screw; and F the head of the screw. H is the groove in which the clasp G is placed, and E is the washer which keeps the clasp firmly in its place, while H is the groove in which the clasp G is set and swings round. The head of the screw F and the washer E form the groove H.

The groove may be formed by the head of the screw and the washer, or it may be cut in the steel; but the clasp must be set in a groove to render my invention complete.

Having thus described my invention, what I claim, and desire to secure by Letters Patent, is—

A clasp for securing the fastenings of windows, consisting of the wire hook or clasp G, in combination with the screw D, having the groove H, substantially as and for the purpose set forth in the above specification.

KATE DUVAL HUGHES.

Witnesses:
D. P. COWL,
W. E. CHAFFEE.